United States Patent [19]

Tsurukawa et al.

[11] Patent Number: 5,146,254
[45] Date of Patent: Sep. 8, 1992

[54] APPARATUS FOR DRIVING VARIFOCAL LENS

[75] Inventors: Ikuya Tsurukawa, Yokohama; Kunihisa Yamaguchi, Ichikawa, both of Japan

[73] Assignee: Ricoh Company, Ltd., Tokyo, Japan

[21] Appl. No.: 711,408

[22] Filed: Jun. 5, 1991

Related U.S. Application Data

[63] Continuation of Ser. No. 509,793, Apr. 17, 1990, abandoned.

[30] Foreign Application Priority Data

| | | | |
|---|---|---|---|
| Apr. 19, 1989 | [JP] | Japan | 1-97265 |
| Apr. 20, 1989 | [JP] | Japan | 1-98774 |
| Feb. 13, 1990 | [JP] | Japan | 2-29703 |

[51] Int. Cl.$^5$ .............................. G03B 3/10
[52] U.S. Cl. .............................. 354/195.12
[58] Field of Search .............................. 354/195.12

[56] References Cited

FOREIGN PATENT DOCUMENTS

| | | |
|---|---|---|
| 57-192524 | 12/1982 | Japan . |
| 60-79314 | 5/1985 | Japan . |
| 60-91311 | 5/1985 | Japan . |
| 1-144006 | 6/1989 | Japan . |
| 1-167709 | 7/1989 | Japan . |
| 1-167710 | 7/1989 | Japan . |
| 1-167814 | 7/1989 | Japan . |
| 1-170910 | 7/1989 | Japan . |

*Primary Examiner*—Michael L. Gellner
*Attorney, Agent, or Firm*—Oblon, Spivak, McClelland, Maier & Neustadt

[57] ABSTRACT

An apparatus for driving a photographic zoom lens in which at least a first and second lens group are disposed on the same optical axis and wherein the apparatus makes it possible to rapidly perform a zooming operation for changing a focal length of the photographic zoom lens. The apparatus comprises a fixed frame and a body tube frame supported within the fixed frame so as to be capable of moving along the optical axis. The apparatus further comprises a first group frame supporting a first lens group, a zooming cam, and a second group frame fixedly supporting a second lens group. Additionally, the apparatus includes a first group driving screw having a first multiple thread screw on a circumferential surface thereof, and adapted to be driven through a first group driving gear and a transmission gear; and a body tube frame driving screw having a second multiple thread screw, and adapted to be driven through a body tube frame driving gear and the transmission gear. The apparatus of the present invention makes it possible to rapidly perform a zooming operation and a housing operation when the power of a driving source and the radius of a driving screw are fixed.

3 Claims, 6 Drawing Sheets

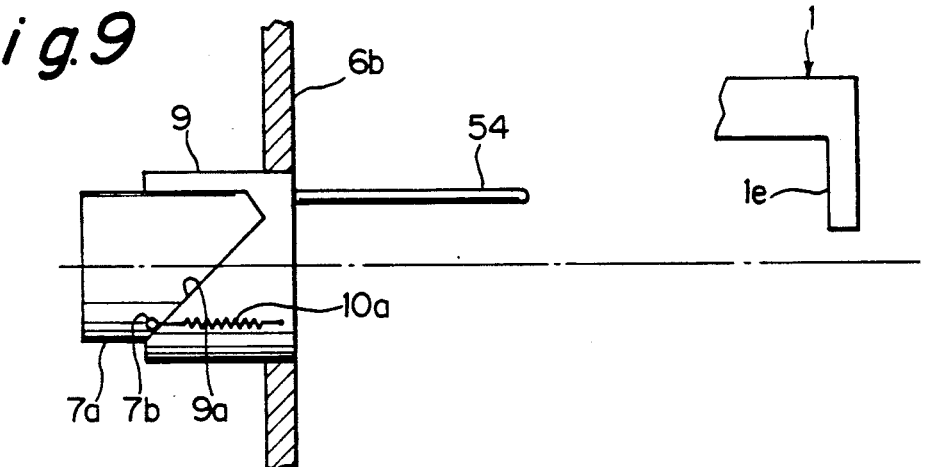
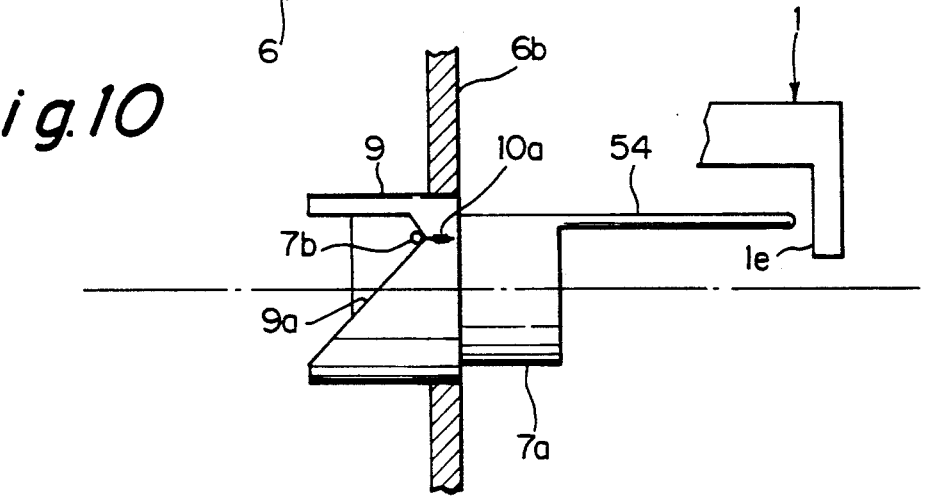
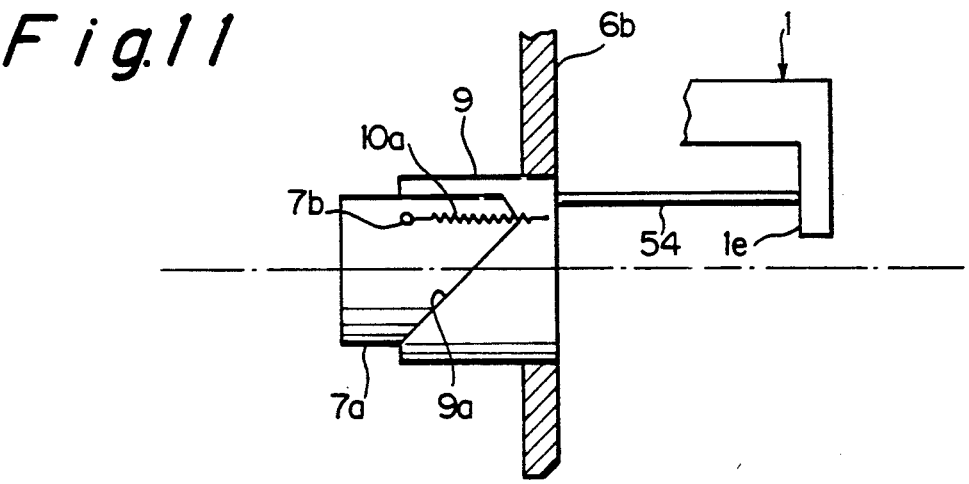

APPARATUS FOR DRIVING VARIFOCAL LENS

This application is a Continuation Ser. No. 07/509,793, filed on Apr. 17, 1990, now abandoned.

BACKGROUND OF THE INVENTION

1. Field of the Invention

The present invention relates to an apparatus for driving a photographic zoom lens in which at least first and second lens groups are disposed on the same optical axis and it is possible to rapidly perform a zooming operation for changing a focal length of the photographic zoom lens composed of a varifocal optical system having the first lens group as a focusing lens and perform a housing operation for moving the first and second lens groups to a housing position.

2. Description of the Related Art

Recently, cameras have been electronized and electrically operated. There are many proposals about a so-called varifocal camera which can set a plurality of focal lengths with respect to a photographing optical system by a single manual operation by driving a motor, etc. In a first proposed example of such a varifocal camera, in general, a cam ring has a cam groove and a cam pin is slidably fitted into the cam groove. The cam ring is rotated to move a lens frame having the cam pin therein in the direction of an optical axis so as to change the focal length of the photographing optical system. Japanese Patent Application Laying Open (KOKAI) No. 60-79314 shows a second proposed example of the varifocal camera in which the lens frame is moved by one thread drive screw instead of the above cam ring in the optical axis direction.

In a third proposed example of the varifocal camera, an operation for housing the lens frame or a body tube, etc. is performed by the cam ring to make the camera compact.

The applicant of this application has proposed an apparatus for driving a photographic zoom lens in which at least first and second lens groups are disposed on the same optical axis and it is possible to perform a zooming operation for changing a focal length of the photographic zoom lens composed of a varifocal optical system having the first lens group as a focusing lens and perform a housing operation for moving the first and second lens groups to a housing position. This apparatus comprises a fixed frame fixed to a fixed section of an optical device such as a camera; a body tube frame movably supported within this fixed frame along the above optical axis; and a first group frame movably supported in parallel to the above optical axis within the body tube frame in a state in which the above first lens group is supported such that this first lens group can be focused. The above apparatus further comprises a moving amount detecting section for detecting a moving amount of this frist group frame with respect to the body tube frame in the optical axis direction; and a cam for zoom rotatably supported by the first group frame around the above optical axis and rotated by the operation of the moving amount detecting section corresponding to the above moving amount. The above apparatus further comprsies a second group frame movable along the above optical axis and restricted and operated by the operation of the above zooming cam in a state in which the second lens group is fixedly supported. The above apparatus further comprises a driving section such as a motor constituting a driving source for performing the above zooming and housing operations; and a transmission mechanical section for transmitting driving force from this driving section. The above apparatus further comprises at least three drive screws operated by this transmission mechanical section to respectively move the body tube frame and the first group frame by predetermined amounts. Members of the body tube frame and the first group frame disposed to be perpendicular to the above optical axis are respectively moved by the above three drive screws in parallel to this optical axis direction in a state in which these members are held to be approximately perpendicular to this optical axis. In the above apparatus, a zooming region for performing the above zooming operation, the movement of the above second group frame is restricted by the operation of the zooming cam. In a housing region for performing the above housing operation, the movement of the second group frame is not restricted by the operation of the zooming cam to hold a predetermined moving position. The above apparatus for driving the photographic zoom lens is proposed in Japanese Patent Application No. 62-326070.

In the first proposed example mentioned above, the construction of the driving apparatus is relatively simplified, but it is complicated to form the cam groove in the cam ring and high accuracy in processing is required so that the manufacturing cost of the apparatus is increased. Further, it is not possible to reduce the length of the cam ring in the optical axis direction so that the body tube cannot be made compact.

In the second proposed example, the lens frame is moved by the one thread drive screw instead of the above cam ring in the optical axis direction. In this case, driving force is concentrated onto a portion of the lens frame so that is is difficult to smoothly move the lenses. Further, the lens frame is inclined and the lenses cannot be held to be perpendicular to the optical axis. Therefore, it s not possible to give a predetermined optical performance of the lenses.

In the third proposed example, the operation for housing the lens frame or the body tube, etc. is performed by the cam ring. In this case, it is necessary to dispose a cam portion for moving the lens frame, etc. to the housing position in addition to a cam portion for performing the zooming operation with respect to the lens frame, etc. so that a pressure angle of the cam is increased. To solve this problem, it is necessary to increase the diameter of the above cam ring so that the size of the body tube is increased and it is difficult to make the apparatus compact.

In this case of the above-mentioned Japanese Patent Application proposed by the same applicant as that of this application, the above problems can be almost solved, but it is desirable to further simplify and make the transmission mechanical section and the drive screws compact and improve transmission efficiency of force so as to rapidly perform the zooming operation.

In this case, the moving amount of the first group frame with respect to the body tube frame in the optical axis direction is detected by a rack and a pinion to rotate the zooming cam. Further, the rotary speed of the pinion is suitably changed to transmit the rotary force to a crown gear integral with the zooming cam. In such a transmission system, a shift in zooming position is caused by an error in engagement between the rack and the gear, an error in engagement between a series of gears, accumulation of backlash of the three drive screws, etc.

SUMMARY OF THE INVENTION

It is therefore an object of the present invention to provide an apparatus for driving a photographic zoom lens in which the apparatus can be made compact and the focal length of the photographic zoom lens can be changed in a wide range and the housing operation can be performed and the zooming and housing operation for changing the above focal length can be rapidly performed without increasing the diameter of a drive screw.

A second object of the present invention is to provide an apparatus for driving a photographic zoom lens in which the apparatus can be made compact and the focal length of the photographic zoom lens can be changed in a wide range and the housing operation can be performed and the zooming operation can be accurately performed almost without any accumulated error in operation of a driving system.

A third object of the present invention is to provide an apparatus for driving a photographic zoom lens in which the relation in position between a plurality of lens groups can be easily adjusted and operability in assembly is improved.

The above first object of the present invention can be achieved by an apparatus for driving a photographic zoom lens in which at least first and second lens groups are disposed on the same optical axis, the apparatus performing a zooming operation for changing a focal length of the photographic zoom lens composed of a varifocal optical system with the first lens group as a focusing lens and a housing operation for moving the first and second lens groups to a housing position. This apparatus comprises a fixed frame fixed to a fixed section of an optical device such as a camera; a body tube frame movably supported within the fixed frame along the optical axis; a first group frame supported within the body tube frame and movable in parallel to the optical axis in a state in which the first lens group is supported such that a focusing operation with respect to the first lens group is performed; a zooming cam rotatably supported by the first group frame around the optical axis; a cam transmission mechanical section for rotating the zooming cam in accordance with a moving amount of the first group frame; a second group frame restricted and driven by the zooming cam and moved along the optical axis in a state in which the second lens group is fixedly supported; a driving section such as a motor as a driving source for performing the zooming and housing operations; a first transmission mechanical section for transmitting driving force from the driving section; and drive screws each composed of at least three multiple thread screws and operated by the first transmission mechanical section to move the body tube frame and the first group frame by respective predetermined amounts, the drive screws moving members of the body tube frame and the first group frame to be perpendicular to the optical axis, in parallel to the optical axis direction in a state in which these members are held to be approximately perpendicular to the optical axis.

The above second object of the present invention can be achieved by an apparatus for driving a photographic zoom lens in which at least first and second lens groups are disposed on the same optical axis, the apparatus performing a zooming operation for changing a focal length of the photographic zoom lens composed of a varifocal optical system with the first lens group as a focusing lens and a housing operation for moving the first and second lens groups to a housing position. This apparatus comprises a fixed frame fixed to a fixed section of an optical device such as a camera; a body tube frame movably supported within the fixed frame along the optical axis; a first group frame supported within the body tube frame and movable in parallel to the optical axis in a state in which the first lens group is supported such that a focusing operation with respect to the first lens group is performed; a zooming cam rotatably supported by the first group frame around the optical axis and rotated in accordance with a moving amount of the first group frame; a second group frame restricted and driven by the zooming cam and movable along the optical axis in a state in which the second lens group is fixedly supported; a driving section such as a motor as a driving source for performing the zooming and housing operations; a first transmission mechanical section for transmitting driving force from the driving section; driving means having at least three drive screws and operated through a transmission wheel rotated by the first transmission mechanical section to move the body tube frame and the first group frame by respective predetermined amounts, the driving means moving members of the body tube frame and the first group frame to be perpendicular to the optical axis, in parallel to the optical axis direction in a state in which these members are held to be approximately perpendicular to the optical axis; and a second transmission mechanical section composed of a speed reduction gear group engaged with the transmission wheel to provide a predetermined reduction gear ratio and a transmission member for transmitting an output of the speed reduction gear group to the zooming cam moved together with the first group frame so as to rotate the zooming cam.

The above third object of the present invention can be achieved by the above-mentioned driving apparatus further comprising an adjusting gear for adjusting the position relation between the first and second lens groups in the second transmission mechanical section and constructed such that the adjusting gear is finally assembled.

In the first embodiment of the present invention, the mulitiple thread screws are rotated by the rotary force of the driving section such as a motor through the first transmission mechanical section to move the first and second lens groups as well as the first group frame and the body tube frame in the optical axis direction. Thus, telescopic, wide and housing states of the driving apparatus are formed and simultaneously the zooming cam is rotated by the rotary force of the driving section through the second transmission mechanical section in accordance with the moving amount of the first group frame. The second lens group is moved by this rotation of the zooming cam together with the second group frame to perform the zooming operation.

In the second embodiment of the present invention, the first and second lens groups are moved in the optical axis direction by the rotary force of the driving source such as a motor through the first transmission mechanical section, the transmission wheel and the driving means such as screws. Thus, the first and second lens groups attain the telescopic, wide and housing states. Simultaneously, the zooming cam is rotated from the transmission wheel through the second transmission mechanical section composed of the speed reduction gear group and the transmission member in accordance with the moving amount of the first froup frame. The lens group of the second group frame is moved by this rotation of the zooming cam in the optical axis direction to perform the zooming operation.

In the third embodiment of the present invention, in addition to the action of the driving apparatus in the second embodiment, the position relation between the first and second lens groups can be especially adjusted by the adjusting gear disposed in the second transmission mechanical section. Further, it is possible to perform all the adjustments in operation as a whole by finally assembling this adjusting gear.

Thus, it is possible to provide normal positions for the first and second lens groups with respect to the fixed frame and a predetermined optical performance.

Further objects and advantages of the present invention will be apparent from the following description of the preferred embodiments of the present invention as illustrated in the accompanying drawings.

BRIEF DESCRIPTION OF THE DRAWINGS

FIGS. 6 to 8 are longitudinal sectional views typically showing three operating states of the driving apparatus in the embodiment shown in FIG. 1 in which:

FIG. 6 shows a housing state of the driving apparatus when the driving apparatus is not used; and FIGS. 7 and 8 respectively show wide and telescopic states of the driving apparatus in which the focal length of an optical system is switched on the sides of shorter and longer focal points;

FIGS. 9 to 11 are partially broken side views for respectively showing telescopic, wide and housing states of the driving apparatus typically to explain the operations of first and second group frames in the above embodiment.

DESRIPTION OF THE PREFERRED EMBODIMENTS

The preferred embodiments of an apparatus for driving a photographic zoom lens in the present invention will next be described in detail with reference to the accompanying drawings.

Figure 1:
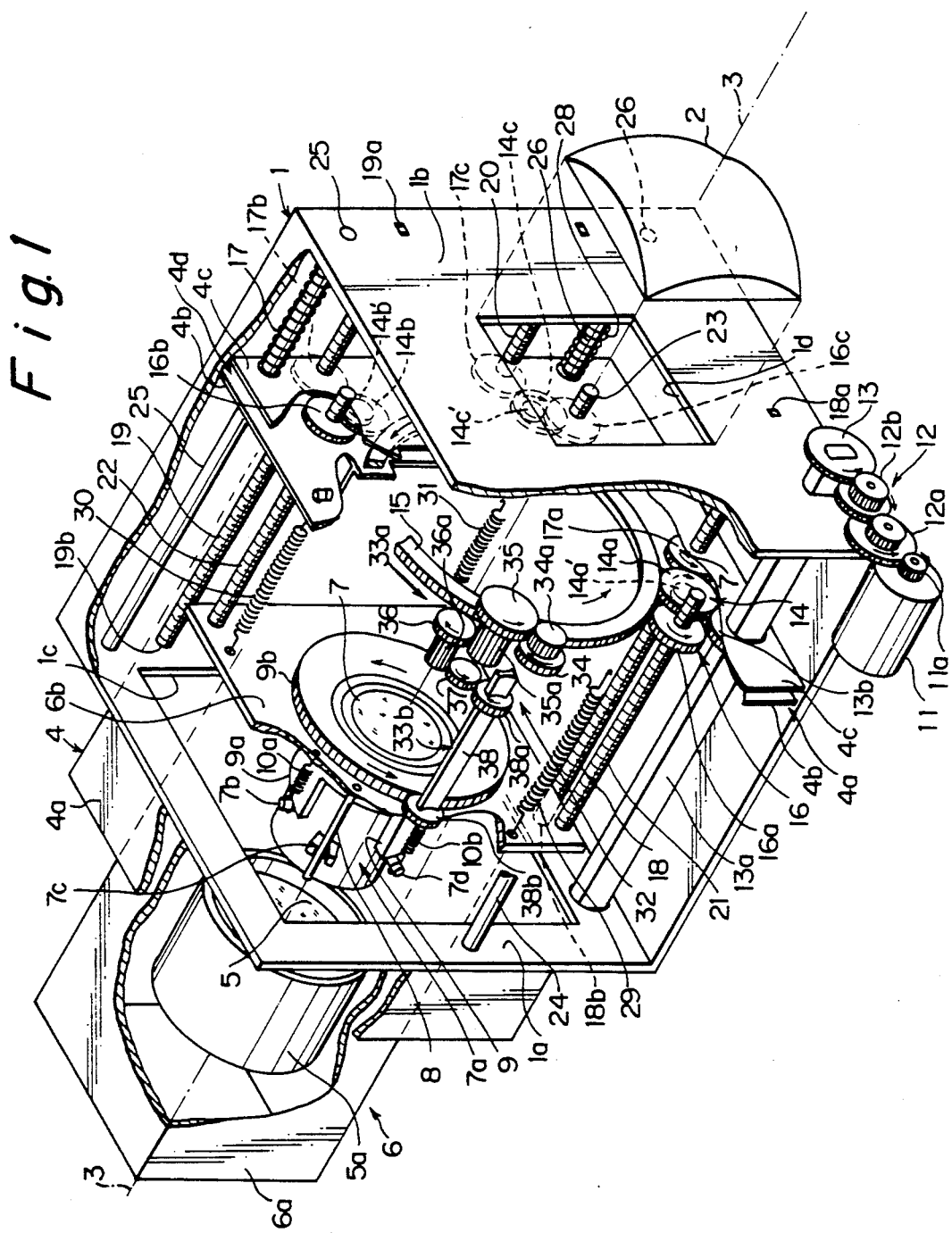
FIG. 1 is a partially broken perspective view showing the entire construction of an apparatus for driving a photographic zoom lens in one embodiment of the present invention.

FIG. 1 is a partially broken perspective view showing the entire construction of an apparatus for driving a photographic zoom lens in accordance with one embodiment of the present invention.

In FIG. 1, a fixed frame 1 is fixed to a fixed section such as a front panel of a camera, etc. An optical axis 3 approximately extends through a center of this fixed frame 1. A front panel 1a and a rear panel 1b are respectively disposed in end portions of the fixed frame 1 on the sides of an unillustrated photographed object and an unillustrated film face such that these panels are approximately perpendicular to the above optical axis 3. A front window 1c is formed by disposing a rectangular hole in the front panel 1a to insert a body tube frame described later into this window. A rear window 1d is formed by disposing a rectangular hole in the rear panel 1b to transmit a photographed light beam through this window.

A third lens 3 is disposed in the position of the rear window 1d on the optical axis 3 and is formed such that upward and downward and right-hand and left-hand peripheral portions of the third lens are constructed by flat faces parallel to the optical axis 3. A body tube frame 4 is disposed within the fixed frame 1 and is movably supported along the optical axis 3. This body tube frame 4 is constructed by a body tube 4a, a body tube first substrate 4b and a body tube second substrate 4c. The body tube 4a is formed in the shape of a box and is disposed in a state in which a center of this body tube is in conformity with the optical axis. The body tube first substrate 4b is constructed by a panel member slightly larger than the body tube 4a in cross section perpendicular to the optical axis 3 and is disposed in a rear end portion of the body tube 4a such that the body tube first substrate 4b is approximately perpendicular to the optical axis 3. The shape of the body tube second substrate 4c is approximately similar to that of the body tube first substrate 4b and the body tube second substrate 4c is formed in a state in which a slight distance is held between the body tube first substrate 4b and the body tube second substrate 4c behind this first substrate 4b. In the following description, the body tube first substrate 4b and the body tube second substrate 4c are called a body tube substrate 4d.

A first lens group 5 is disposed on a side of the driving apparatus on the optical axis 3 nearest with respect to the unillustrated photographed object. The first lens group 5 is fixed and supported by a cylindrical first lens frame 5a. A first group frame 6 is movably supported in parallel to the optical axis 3 within the above body tube frame 4 in a state in which the first lens frame 5a is supported within the first group frame 6. The first group frame 6 is constructed by a tubular portion 6a, a first group substrate 6b and a constructional portion 6c. The tubular portion 6a has a rectangular shape along the optical axis 3 and has a rectangular shape in cross section. The first group substrate 6b is disposed in a rear end portion of the tubular portion 6a and is constructed by a panel member slightly larger in cross section than the tubular portion 6a.

The first lens group 5 (the first lens frame 5a) is moved integrally with the first group frame 6 when the first group frame 6 is moved. However, the first lens group 5 is constructed such that this first lens group is moved independently of the first group frame 6 by an unillustrated focusing mechanical section disposed on an inner wall of the first group frame 6, thereby fulfilling a function of a focusing lens.

A second lens group 7 is disposed backward from the first lens group 5 on the optical axis 3. The second lens group 7 is fixed and supported by a cylindrical second group frame 7a on the same axis as the optical axis 3. A cam pin 7b is disposed on an outer circumference of the second group frame 7a in a direction perpendicular to the optical axis 3 and comes in contact with a cam face described later. A slider 7c is additionally disposed on the outer circumference of the second group frame 7a to prevent the rotation of the second group frame 7a and has a forked portion for guiding the movement of the second group frame 7a in the direction of the optical axis 3a. A spring peg 7d is disposed on the outer circumference of the second group frame 7a. A bar-shaped second group frame guide 8 is fixed to the first group frame 6 (i.e., the first group substrate 6b) and is slidably fitted into the forked portion of the slider 7c. A second group frame cam 9 as a zooming cam is constructed by a tubular member having openings at both ends thereof. An outer circumference of the second group frame cam 9 is fitted into a hollow bearing portion disposed in a central portion of the first group substrate 6b in a state in which the second group frame 7a is fitted to an inner circumference of the second group frame cam 9. The second group frame cam 9 is rotatably supported arounds the optical axis 3 so as not to be moved in the direction of the optical axis 3. A cam face 9a is disposed at a front end edge of the second group frame cam 9 and slidably comes in contact with the cam pin 7b. A second group frame cam gear 9b is fixed to a rear end portion of the second group frame cam 9. Second group springs 10a and 10b are respectively disposed between the cam pin 7b and the first group substrate 6b and between the spring peg 7d and the first group substrate 6b in a state in which a tension is given to each of these second group springs 10a and 10b.

A motor 11 as a driving section is disposed in the fixed frame 1. A reduction gear series 12 is disposed in the fixed frame 1 and is composed of reduction gears 12a and 12b and is driven by a motor gear 11a of the motor 11. A drive gear 13 has an approximately rectangular hole with convex end portions in a central portion thereof and is driven by the motor 11 through the reduction gear series 12. A drive shaft 13a is rotatably supported at both ends thereof by the front panel 1a and the rear panel 1b of the fixed frame 1 in a state in which the drive shaft 13a is inserted into a bearing hole disposed in the body tube substrate 4d. The drive shaft 13a has an approximately rectangular shape with convex end portions in cross section and is fitted and fixed into the above approximately rectangular hole of the drive gear 13 in an end portion of the fixed frame backward from the rear panel 1b. The drive shaft 13a is constructed by a bar-shaped member parallel to the optical axis 3. A movable gear 13b is supported between the body tube first substrate 4b and the body tube second substrate 4c and has an insertion hole having an approximately rectangular shape with convex end portions. The drive shaft 13a is inserted into this insertion hole of the movable gear 13b to transmit rotary force of the drive shaft 13a. The movable gear 13b can be integrally moved with the body tube substrate 4d in the direction of the optical axis 3 by a screw action of drive screws described later.

Gears 14a, 14b, 14c, 15, 16a, 16b, 16c, 17a, 17b and 17c are rotatably disposed between the body tube first substrate 4b and the body tube second substrate 4c. The gears 14a, 14b and 14c are respectively constructed by two-stage gears having gears 14a', 14b' and 14c' having small diameters on end faces of the gears 14a, 14b and 14c on the front sides thereof. Female screws are screwed into holes disposed in central portions of the gears 16a, 16b, 16c, 17a, 17b and 17c. The gear 14a constructs a transmission gear engaged with a movable gear 13b. The gear 15 constructs a ring gear as a transmission wheel engaged with the transmission gear 14a and having a central portion formed in the shape of a large ring so as to transmit a photographed light beam therethrough. The gears 14b and 14c construct transmission gears engaged with the ring gear 15. The gears 16a, 16b and 16c construct first group drive gears engaged with the gears 14a', 14b' and 14c' having small diameters in the above transmission gears 14a, 14b and 14c, respectively. The gears 17a, 17b and 17c construct body tube drive gears engaged with the above transmission gears 14a, 14b and 14c, respectively.

In the following description, the transmission gears 14a, 14b and 14c are called a transmission gear 14. The first group drive gears 16a, 16b and 16c are called a first group drive gear 16. The body tube drive gears 17a, 17b and 17c are called a body tube drive gear 17. A first transmission mechanical section is constructed by the transmission gear 14, the ring gear 15, the body tube drive gear 17 and the first group drive gear 16.

A body tube drive screw 18 is supported by peripheral portions of the rear panel 1b and the front panel 1a such that both end portions 18a and 18b of this body tube drive screw 18 are not respectively rotated with some backlash. The body tube drive screw 18 has a right-handed screw for example approximately over the entire length thereof and constructs a drive means screwed to the above female screw of the body tube drive gear 17a and parallel to the optical axis 3. This body tube drive screw 18 is formed in the shape of a multiple thread screw. In this embodiment, the body tube drive screw 18 is constructed by a two thread screw having a right-handed screw.

Similarly, a body tube drive screw 19 is supported by the fixed frame 1 in both end portions 19a and 19b thereof so as not to be rotated. The body tube drive screw 19 constructs a drive means screwed to the female screw of the body tube drive gear 17b. The body tube drive screw 19 is constructed by a multiple thread screw having a right-handed screw.

Similarly, a body tube drive screw 20 as a drive means is screwed to the female screw of the body tube drive gear 17c and is constructed by a multiple thread screw having a right-handed screw in this emodiment.

First group drive screws 21, 22 and 23 as the drive means are supported by peripheral portions of the first group substrate 6b in respective front end portions thereof so as not to be rotated with some backlash and be separated from the first group substrate 6b. Each of the first group drive screws 21, 22 and 23 has a left-handed screw for example approximately over the entire length thereof. The first group drive screws 21, 22 and 23 are repectively screwed into female screws of the first group drive gears 16a, 16b and 16c. The first group drive screws 21, 22 and 23 are composed of two thread screws each having the same pitch as that of each of the body tube drive screws 18, 19 and 20 approximately parallel to the optical axis. The body tube drive screws 18 and 20 and the first group drive screws 21 to 23 respectively construct three drive screws.

Guide shafts 24, 25 and 26 are respectively fixed to the front panel 1a and the rear panel 1b(e.g., the fixed frame 1) at the front and rear ends thereof approximately in parallel to the optical axis 3 in a state in which these guide shafts 24, 25 and 26 are inserted into guide holes disposed in peripheral portions of the body tube substrate 4d.

Body tube springs 27 and 28 are composed of coil springs inserted between the rear panel 1b and the body tube substrate 4d of the guide shafts 25 and 26 for these body tube springs 27 and 28. A compression force is given to each of these body tube springs 27 and 28. A body tube spring is also disposed with respect to the guide shaft 24 although this spring is not shown in the figures.

First group springs 29 to 31 are disposed between the first group substrate 6b and the body tube first substrate 4b and are biased in a direction in which the first group substrate 6b and the body tube first substrate 4b approach each other.

A second transmission mechanical section 32 rotates the second group frame cam 9 at a predetermined reduction gear ratio by the rotary driving force of the ring gear 15. The second transmission mechanical section 32 is composed of a speed reduction gear group 33a and a transmission member 33b. Namely, a first gear 34 is engaged with the ring gear 15 and a small gear 34a thereof is engaged with an adjusting gear 35. A small gear 35a of the adjusting gear 35 is engaged with a second gear 36. A small gear 36a of the second gear 36 is engaged with a third gear 37, thereby constructing the speed reduction gear group 33a.

The third gear 37 is engaged with an input gear 38a slidably supported in the optical axis direction by a transmission shaft 38 having an approximately rectangular shape with concave portions in cross section at one end thereof. An output gear 38b is supported by the transmission gear 38 at the other end thereof and is engaged with the second group frame cam gear 9b, thereby constructing the transmission member 33b.

A plurality of guide shafts parallel to the optical axis 3 are fixed to the body tube frame 4 and are inserted into guide holes disposed in peripheral portions of the first group substrate 6b for example although these guide shafts are not shown in the figures. These guide shafts are constructed to guide and restrict the movement of the first group frame 6 in the optical axis direction.

The first lens group 5, the second lens group 7 and the third lens 2 construct a varifocal optical system.

FIG. 1 shows a telescopic state of the driving apparatus in which the focal length of the optical system is set on the side of a long focal point.

On rotations of the body tube drive gear 17 and the first group drive gear 16 correspond to one pitches of the body tube drive screws 18 to 20 and the first group drive screws 21 to 23.

In FIGS. 2 to 12, the same members as those in FIG. 1 are designated by the same reference numerals and therefore the description thereof is omitted in the following description.

Figure 2:
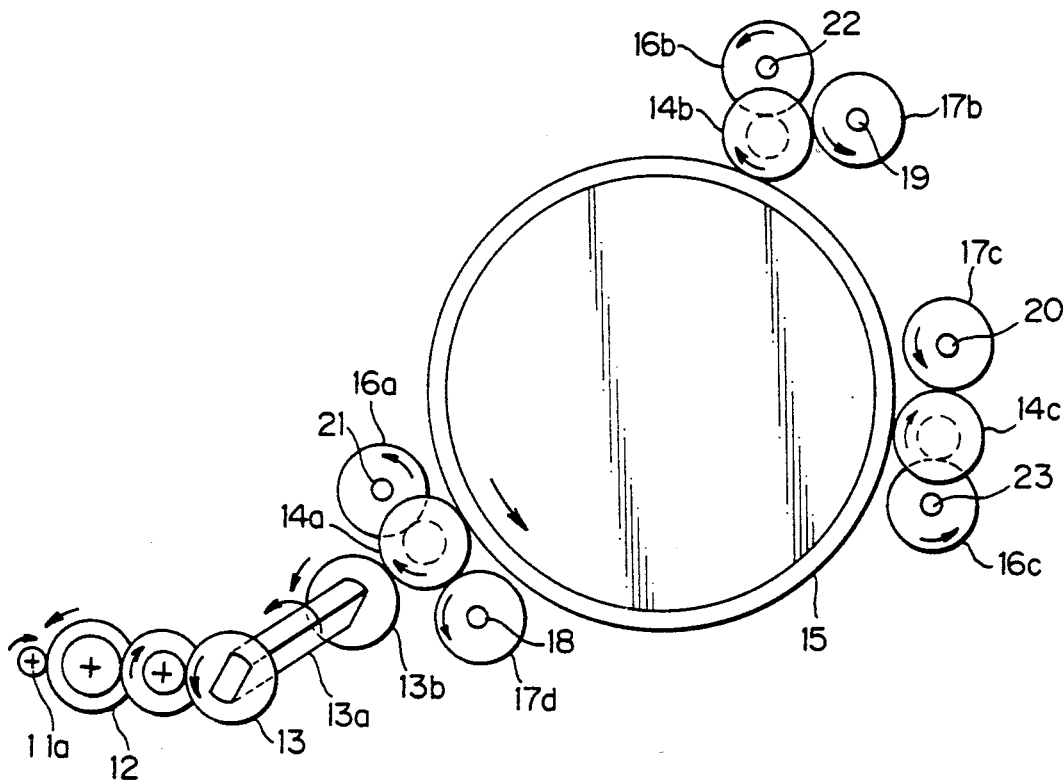
FIG. 2 is a view schematically showing a first transmission mechanical section in the embodiment of FIG. 1 seen backward on an optical axis.

FIG. 2 shows a transmission path of driving or rotary force and shows the first transmission mechanical section seen backward on the optical axis 3.

Figure 3:
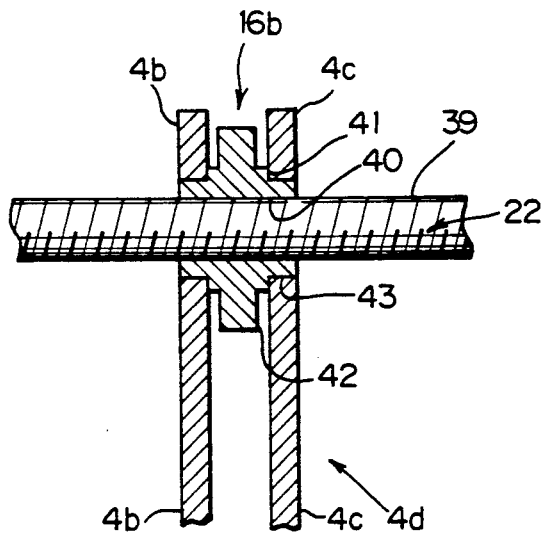
FIG. 3 is a longitudinal cross-sectional side view mainly showing a first group drive gear 16b in FIG. 1 and partially enlarging the construction of the above first transmission mechanical section.

FIG. 3 is a longitudinal cross-sectional view mainly showing e.g., the first group drive gear 16b in FIG. 1 and partially enlarging the first transmission mechanical section.

In FIG. 3, reference numerals 39 and 40 respectively designate a male screw portion of the first group drive screw 22 and a female screw portion of the first group drive gear 16b. A step portion 41 is disposed to reduce frictional force transmitted from the body tube substrate 4d by thrust force generated in the first group drive gear 16b. Reference numerals 42 and 43 respectively designate a gear portion of the first group drive gear 16b and cylindrical shaft portions projected in the shape of a cylinder from central portions of the first group drive gear 16b on both ends faces thereof.

Figure 4:
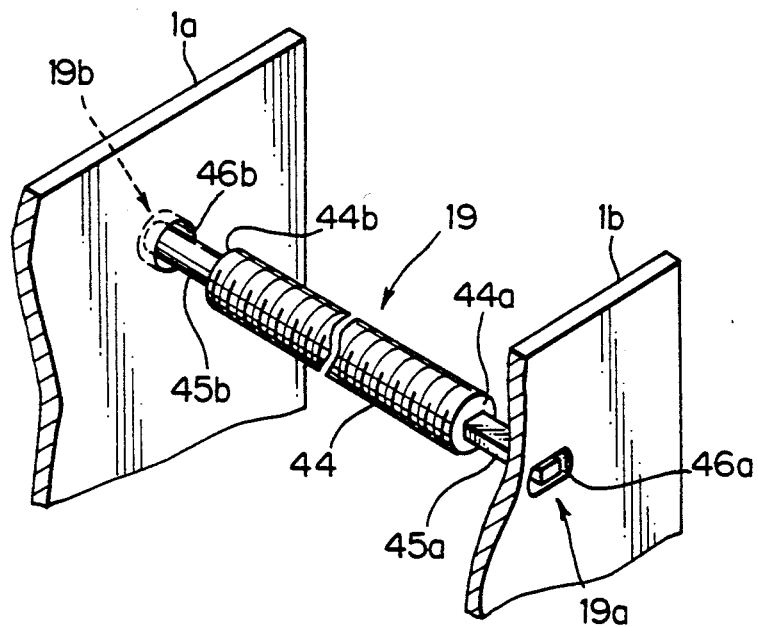
FIG. 4 is a perspective view mainly showing a body tube drive screw 19 in FIG. 1 and enlarging the detailed construction of this body tube drive screw at both ends thereof.

FIG. 4 is an enlarged perspective view mainly showing the detailed construction of the body tube drive screw 19 at both ends thereof in FIG. 1.

In FIG. 4, reference numerals 44, and 44a and 44b respectively designate a screw portion having a male screw of the body tube drive screw 19, rear and front end faces of this screw portion 44. Shafts 45a and 45b respectively have an approximately rectangular shape with convex end portions and a circular shape in cross section. The rectangular shaft 45a and the circular shaft 45b are integrally connected onto the above end faces 44a and 44b, respectively and have sizes smaller than the diameter of the screw portion 44. Support holes 46a and 46a are respectively disposed in the rear panel 1b and the front panel 1a. The support holes 46a and 46b have shapes similar to the approximately rectangular and circular shapes of the shafts 45a and 45b in cross section and have sizes slightly larger than the outer sizes of these shafts 45a and 45b.

In FIG. 4, the shafts 45a and 45b are shown to have long lengths exaggeratedly so as to clarify the construction thereof. In a real assembly state, the front and rear panels 1a and 1b are respectively disposed in positions slidable with respect to the end faces 44b and 44a. The axial position of the body tube drive screw 19 is accurately restricted in the respective end portions 19a and 19b thereof such that this body tube drive screw 19 has a slight degree of freedom in the circumferential direction thereof.

Figure 5:
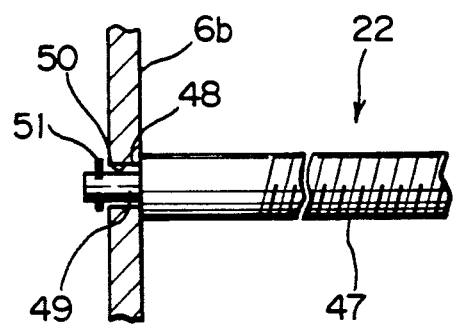
FIG. 5 is a longitudinal sectional view mainly showing a first group drive screw 22 in FIG. 1 and enlarging the detailed construction of an end portion of this first group drive screw on a side thereof supported by a first group substrate 6b.

FIG. 5 is a longitudinal sectional side view mainly showing the first group drive screw 22 in FIG. 1 and enlarging the detailed construction of an end portion of the first group drive screw 22 on a side thereof supported by the first group substrate 6b.

In FIG. 5, reference numerals 47 and 48 respectively designate a screw portion of the first group drive screw 22 and an end face of this screw portion 47. A shaft portion 49 is formed to have a diameter smaller that of the screw portion 47 from the above end face 48 to a shaft end portion. A support hole 50 is disposed in the first group substrate 6b and receives this shaft portion 49. An E-ring 51 is fitted into a circumferential groove formed in a portion of the shaft portion 49 projected from the first group substrate 6b. The E-ring 51 is disposed such that the E-ring 51 comes in slide contact with the first group substrate 6b or is very near this first group substrate 6b. The support hole 50 has an inner diameter slightly larger than the outer diameter of the shaft portion 49. The shaft portion 49 has a slight degree of freedom in the diametrical direction of the support hole 50 and the position of the shaft portion 49 is restricted by the end face 48 in the axis direction. The shaft portion 49 is constructed such that this shaft portion is not separated from the first group substrate 6b by the E-ring 51.

Figure 6:
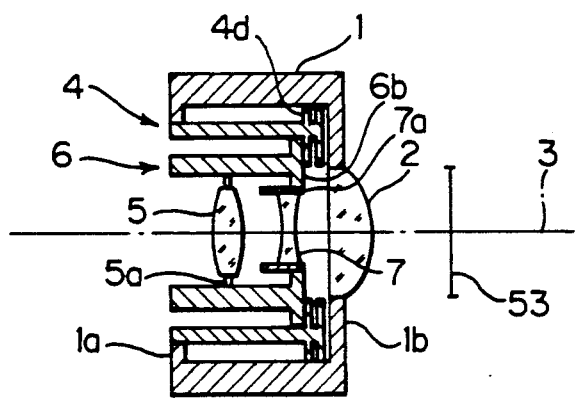
Figure 7:
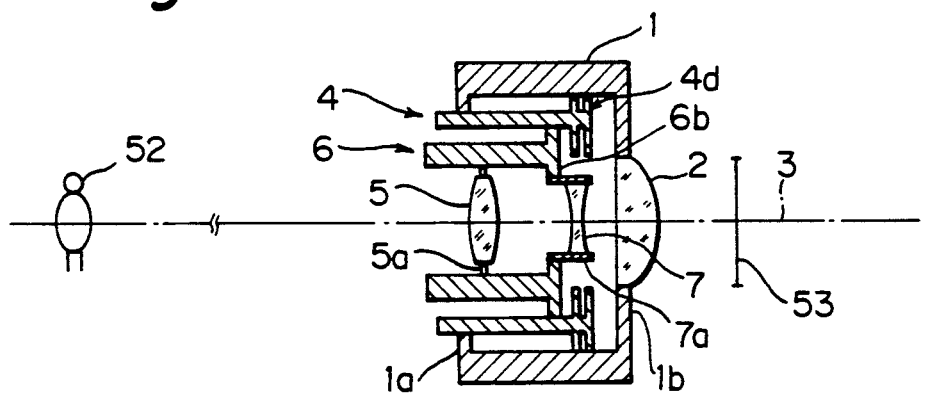
Figure 8:
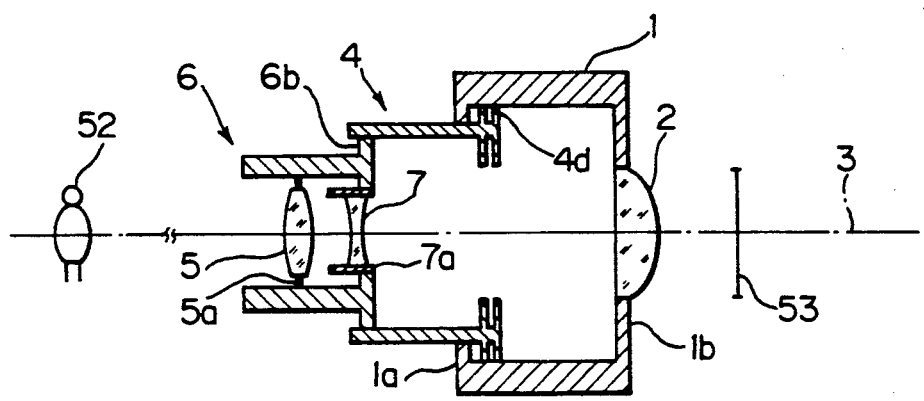

FIGS. 6 to 8 are longitudinal sectional side views typically showing three operating states of the driving apparatus caused by the zooming and housing operations in the embodiment In FIG. 1. FIG. 6 shows a housing state of the driving apparatus in which the first and second lens group are moved to the housing position. FIG. 7 shows a wide state of the driving apparatus in which the focal length of the optical system is set onto the side of a short focal point. FIG. 8 shows the above-mentioned telescopic state of the driving apparatus.

In FIGS. 6 and 7, reference numerals 52 and 53 respectively designate a photographed object located in the front of the first lens group 5 and a film face located behind the third lens 2. As described in the embodiment of FIG. 1, the first lens frame 5a is not directly fixed to the first group frame 6, but is supported by the first group frame 6 so as to change the position relative to this first group frame 6 by the above focusing mechanical section fixed to the first group frame 6. Accordingly, the first lens frame 5a is integrally moved with the first group frame 6 while the focusing mechanical section is not operated. When the focusing mechanical section is operated, the first lens frame 5a can be moved along the optical axis 3 independently of the first group frame 6.

FIGS. 9 to 11 are side views typically showing the operating relation between the first group frame 6 and the second group frame 7a forming a main construction of the driving apparatus in the present invention. FIGS. 9 to 11 respectively show the telescopic, wide and housing states of the driving apparatus. In these figures, the second group frame cam 9 is shown as a reference to clarify the corresponding relation between the cam face 9a and the second group frame 7a. However, in reality, as described in the embodiment of FIG. 1, the second group frame cam 9 is rotated and the second group frame 7a is linearly moved with respect to the optical axis 3. In FIGS. 9 to 11, projecting member 54 is extended along the optical axis 3 backward from the second group frame 7a. The length of the projecting member 54 is set such that the rear end position of this projecting member 54 is located just before a contact position between the projecting member and a stopper 1e constructing a portion of the fixed frame 1 in the wide state of the driving apparatus.

Figure 12:
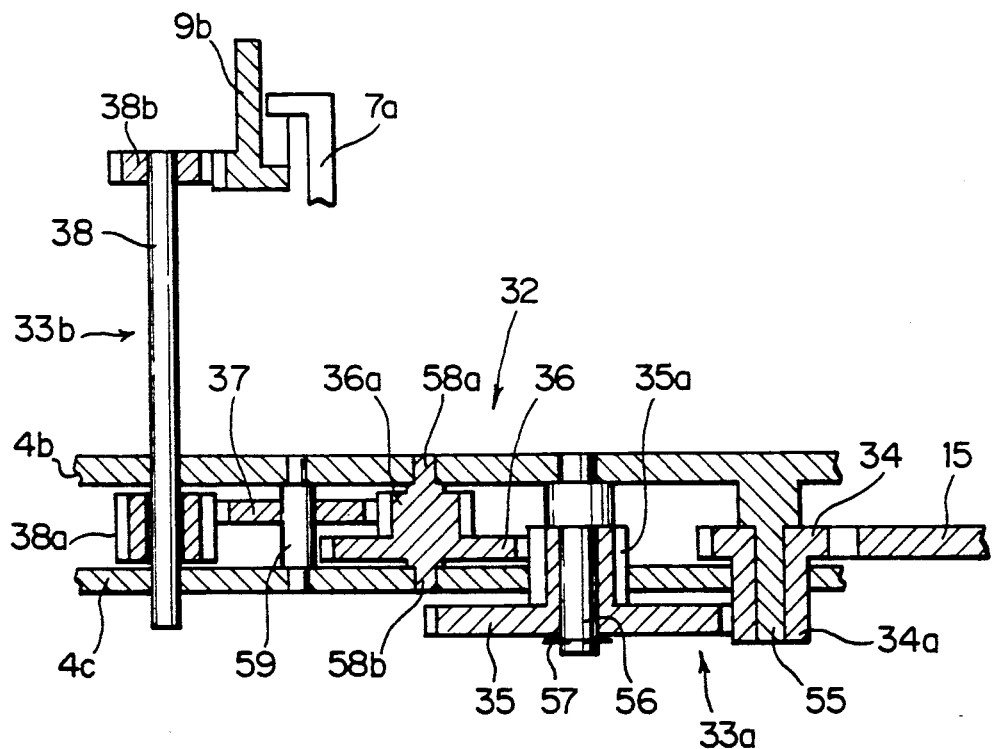
FIG. 12 is a view showing the construction of a second transmission mechanical section in the above embodiment.

FIG. 12 is a view concretely showing the construction of the above second transmission mechanical section 32. The above first gear 34, the second gear 36, the third gear 37 and the input gear 38a of the transmission shaft 38 are supported between the body tube first substrate 4b and the body tube second substrate 4c mentioned above. The adjusting gear 35 is disposed outside the body tube second substrate 4c.

In FIG. 12, reference numerals 55 and 56 respectively designate shafts for supporting the first gear 34 and the adjusting gear 35. An E-ring 57 is attached to an end portion of the shaft 56 to prevent the adjusting gear 35 from being moved out of the second transmission mechanical section 32. Shaft pins 58a and 58b are disposed on both sides of the second gear 36 and are respectively supported by the substrates 4b and 4c. A shaft 59 is disposed to support the third gear 37. The transmission shaft 38 having an approximately rectangular shape with concave portions in cross section slidably supports the above input gear 38a and is rotatably supported by the substrates 4b 4c.

The operation of the driving apparatus constructed above will next be described.

An operation for transmitting rotary force will first be described with reference to FIGS. 1 and 2.

For example, when the motor gear 11a of the motor 11 is rotated in the clockwise direction as shown by a solid line arrow in FIG. 1, the drive gear 13 is rotated through the speed reduction gear series 12 in the counterclockwise direction. The movable gear 13b is then rotated by the rotary force of the drive gear 13 through the drive shaft 13a in the counterclockwise direction. The transmission gear 14a enagaged with the movable gear 13b is then rotated in the clockwise direction and the ring gear 15 engaged with this transmission gear 14a is rotated in the counterclockwise direction. The transmission gears 14b and 14c engaged with the ring gear 15 are then rotated in the clockwise direction. Namely, all the three transmission gears 14a, 14b and 14c are rotated in the clockwise direction. All the three body tube drive gears 17a, 17b and 17c and all the three first group drive gears 16a, 16b and 16c respectively engaged with the transmission gears 14a, 14b and 14c are rotated in the counterclockwise direction. Accordingly, the rotary direction of the motor gear 11a of the motor 11 is opposite to that of the body tube drive gear 17 and the first group drive gear 16.

The next description relates to an operation for switching a short focal point from the telescopic state of the driving apparatus shown in FIGS. 1, 8 and 9 to the wide state of the driving apparatus shown in FIGS. 7 and 10. As mentioned above, when the body tube drive gear 17 and the first group drive gear 16 are rotated in the counterclockwise direction, the body tube drive screws 18 to 20 cannot be axially moved and rotated when the body tube drive screws 18 to 20 screwed into the respective female screws of the body tube drive gear 17 are constructed by right-handed screws. Accordingly, the body tube drive gear 17 is moved backward on the optical axis 3 while this body tube drive gear 17 is rotated. By this backward movement of the body tube drive gear 17, the body tube substrate 4d, i.e., the body tube frame 4 begins to be guided and moved backward by the guide shafts 24 to 26 against the biasing force of the body tube springs 27 and 28.

When the first group drive screws 21 to 23 composed of multiple thread screws and screwed into the respective female screws of the first group drive gear 16 are constructed by left-handed screws, the first group drive gear 16 begins to be moved forward, but the position of this first group drive gear 16 in the optical axis direction is restricted by the body tube substrate 4d. As a result, the first group drive screws 21 to 23 are moved backward on the optical axis 3. Namely, the first group frame 6 begins to be guided and moved backward by unillustrated guide shafts by the biasing force of the first group springs 29 to 31. Accordingly, the first group frame 6 is moved backward within the body tube frame 4 with respect to the fixed frame 1 and is further moved backward relatively with respect to the body tube frame 4.

The above ring gear 15 rotated in the counterclockwise direction is engaged with the first gear 34 of the speed reduction gear group 33a and are further sequentially engaged with the gears 34a, 35, 35a, 36, 36a, 37 and 38a. The second group frame cam gear 9b is rotated by the rotation of the input gear 38a through the transmission shaft 38 in the counterclockwise direction. Namely, the rotary speed of the ring gear 15 is reduced by the speed reduction gear group 33a and to a predetermined reduction gear ratio and the rotary speed of the second group frame cam 9 is reduced and this second group frame cam 9 is rotated in the counterclockwise direction together with the second group frame cam gear 9b through the transmission member 33b. In this case, the input gear 38a attached to the transmission shaft 38 of the transmission member 33b allows the backward movement of the transmission shaft 38 caused by the backward movement of the first group frame 6 while this input gear 38a is engaged with the third gear 37. Thus, the cam pin 7b coming in slide contact with the cam face 9a by the rotation of the second group frame cam 9 begins to be slantingly moved backward along the inclination of the cam face 9a since this cam pin 7b is biased backward by the second group springs 10a and 10b. However, only the linear movement of the second group frame 7a in the direction of the optical axis 3 is allowed by the slider 7c and the second group frame guide 8 so that the second group frame 7a is moved backward in parallel to the optical axis 3.

As shown in FIG. 10, when the cam pin 7b is further moved to the wide position of the cam face 9a shown by an approximately V-shaped portion, the projecting amount of the second group frame 7a projected backward from the first group substrate 6b becomes maximal and the projecting member 54 has reached a position just before the stopper portion 1e of the fixed section 1. Namely, as shown in FIG. 7, a front end portion of the body tube frame 4 (e.g., the body tube 4a) is slightly projected forward from the front window 1a of the fixed frame 1. The first group frame 6 (e.g., the tubular portion 6a) is slightly projected forward from the front end portion of the body tube 4a. Further, the second group frame 7a is located backward by the above backward projecting amount. Thus, the driving apparatus has attained the wide state.

The housing operation of the driving apparatus from this wide state to the housing state shown in FIGS. 6 and 11 will next be described. The body tube drive gear 17 and the first group drive gear 16 are rotated in the counterclockwise direction as mentioned above. Accordingly, the body tube frame 4 and the first group frame 6 are respectively continuously moved backward as mentioned above. However, as shown in FIG. 11, the projecting member 54 hits against the stopper portion 1e of the fixed frame 1 in a housing region for performing the above housing operation so that the second group frame 7a cannot be moved backward any more. Thus, the position of the second group frame 7a is held, but the first group frame 6 (the first group substrate 6b) and the body tube frame 4 are further moved backward. Accordingly, the cam face 9a is relatively moved backward and separated from the cam pin 7b against the resilient force of the second group springs 10a and 10b. Thus, as shown in FIG. 6, the respective front end portions of the body tube frame 4 and the first group frame 6 are approximately aligned with the front panel 1a on a line. The above backward projecting amount of the second group frame 7a becomes minimal (approximately zero) and the rear end of the second group frame 7a is approximately aligned with the first group substrate 6b on a line. Thus, the driving apparatus has attained the housing state.

The zooming operation of the driving apparatus in the direction of a long focal point from this housing state to the telescopic state shown in FIGS. 1, 8 and 9 will next be described briefly.

The motor gear 11a is rotated in the counterclockwise direction by reversing the electric current polarity of the motor 11 and flowing an electric current through the motor 11. Thus, the body tube drive gear 17 and the first group drive gear 16 are rotated in the clockwise direction. Accordingly, the body tube frame 4 is moved forward and the first group frame 6 is further moved forward with respect to this body tube frame 4. With respect to the first group frame 6 and the second group frame 7a, as shown in FIGS. 11 and 10, the second group frame 7a is pulled by the second group spring 10a toward the first group substrate 6b even when the first group frame 6 (the first group substrate 6b) is moved. Accordingly, the position of the second group frame 7a is held and only the first group frame 6 is moved forward. After the first group frame 6 is moved forward to the position shown in FIG. 10, the movement of the second group frame 7a is restricted by the first group frame cam 9. Namely, the movement of the second group frame 7a is not restricted by the cam face 9a in the housing region between the housing and wide states. Further, the body tube frame 4 and the first group frame 6 are moved forward and the second group frame cam gear 9b is rotated in the clockwise direction. The cam pin 7b coming in slide contact with the cam face 9a is slantingly pushed forward by the rotation of the second group frame cam gear 9b. Thus, the rotary movement of the second group frame cam gear 9b is converted to a linear movement by the slider 7c and the second group frame guide 8 and the second group frame 7a is moved forward.

As shown in FIGS. 8 and 1, the body tube frame 4 and the first group frame 6 are respectively moved forward approximately by the maximal amounts with respect to the fixed frame 1 and the body tube frame 4. The second group frame 7a is also moved forward approximately by the maximal amount from the first group substrate 6b. Thus, the rear end of the second group frame 7a is approximately aligned with the first group frame 6b on a line. Thus, the driving apparatus has attained the telescopic state.

As mentioned above, in accordance with the present invention, the body tube frame 4 is movably supported along the three guide shafts 24 to 26 fixed to the fixed frame 1 and approximately parallel to the optical axis 3. The first group frame 6 supporting the first lens group 5 is movably supported within the body tube frame 4 by unillustrated plural guide shafts fixed to the body tube frame 4 in a state in which this first group frame 6 is approximately parallel to the optical axis 3. Further, the second group frame 7a supporting the second lens group 7 is supported within the second group frame cam 9 so as to be moved forward and backward. The body tube frame 4 is moved forward and backward by the body tube drive screws 18 to 20 composed of three multiple thread screws by using the first transmission mechanical section driven through the drive shaft 13a and the movable gear 13b. Further, the first group frame 6 is moved forward and backward by the first group drive screws 21 to 23 composed of three multiple thread screws. The rotary speed of the second group frame cam 9 is reduced to that at a predetermined reduction gear ratio by the second transmission mechanism 32 from the ring gear 15 in accordance with the moving amount of the first group frame 6. The second group frame cam 9 is thus rotated at this reduction gear ratio to move the second group frame 7a forward and backward. Accordingly, in the present invention, there are no conventional disadvantages that the positions of the first lens group 5 and the second lens group 7 become unstable by the movements of the body tube frame 4 and the first group frame 6.

In particular, in the driving apparatus in the first embodiment of the present invention, the drive screws for moving the body tube frame 4 and the first group frame 6 forward and backward are constructed by multiple thread screws so that it is possible to rapidly perform the zooming and housing operations with respect to a camera while the diameters of the screws are not increased and therefore the compactness of the camera is held. Further, it is possible to reduce the rotary speed of the motor 11 without reducing the moving speeds of the first group frame 6 and the body tube frame 4 by using the multiple thread screws. In other words, the reduction gear ratio of the first transmission mechanical section can be increased so that it is possible to reduce loss of operation with respect to the motor 11, thereby providing an efficient transmission mechanism.

Namely, a load coefficient $\eta$ by one thread screw and a load coefficient $\eta'$ by a multiple thread screw in accordance with the present invention can be calculated by the following formulas.

$$\eta = \frac{P/2\pi r + \mu}{1 - \mu(p/2\pi r)} + F$$

$$\eta' = \frac{(P/2\pi r)n + \mu}{(1 - \mu(p/2\pi r)n)/n} + \frac{F}{n}$$

Here, reference numerals n, F', $\mu$, P and r respectively designate the number of threads of the screw, a loss coefficient of a substrate, etc., a frictional coefficient of the screw, a pitch of the one thread screw, and a radius of the screw.

As can seen from the above formulas, the load coefficient can be reduced when the reduction gear ratio (the number of threads of the screw) is increased.

The following table shows the load coefficient $\eta'$ with respect to the number n of threads of the screw.

| n | $\eta'$ ($\mu = 0.2$) |
|---|---|
| 1 | 0.507 |
| 2 | 0.29 |
| 3 | 0.22 |
| 4 | 0.18 |
| 5 | 0.16 |

Since both the body tube frame 4 and the first group frame 6 are moved forward and backward with respect to the fixed frame 1, the length of the entire driving apparatus in the direction of the optical axis 3 is approximately the same length as that of the fixed frame 1 in the housing state and the driving apparatus becomes very compact although the varifocal optical system has a large zoom ratio. Further, in the housing region, the second group frame 7a is constructed such that this second group frame is not driven (not restricted) by the cam face 9a of the second group frame cam 9. Accordingly, the pressure angle of the cam face 9a can be reduced so that the diameter of the second group frame cam 9 can be reduced and the driving apparatus can be made more compact.

Further, no cam ring often used in the conventional driving apparatus is used to move the body tube frame 4 and the first group frame 6. Accordingly, it is possible to save a high cost required to manufacture the cam ring so that the driving apparatus can be cheaply manufactured.

The moving amounts of the first group frame 6 and the body tube frame 4 can easily set by the gear ratio of the transmission gear 14 composed of a two-stage gear so that degree of freedom with respect to design is large.

Further, the moving amounts of the body tube frame 4 and the first group frame 6 can be set by changing the respective leads of the body tube drive screws 18 to 20 and the first group drive screws 21 to 23. Accordingly, degree of freedom with respect to design, e.g., the degree of freedom in the arrangement of a mechanism for preventing leakage of light is large.

The positions of the body tube drive screws 18 to 20 are accurately restricted in the axial direction in the respective end portions thereof 18a, 19a and 18b, 19b. However, each of the body tube drive screws 18 to 20 has a suitable backlash in the circumferential direction thereof. Accordingly, even when there are errors in manufacture in the body tube drive screws 18 to 20, the first group drive screws 21 to 23, the body tube drive gear 17 and the first group drive gear 16 screwed to these screws and the entire first transmission mechanism. No excessive force is applied to these members and these members can be smoothly operated and there is no fear that the motor 11, etc. are overloaded.

The body tube drive screws 18 to 20 and the first group drive screws 21 to 23 are moved by their lead amounts (n pitches in the case of an n-multiple thread screw where n is a positive integar) in accordance with one rotations of the body tube drive gear 17 and the first group drive gear 16. Accordingly, the accuracy in movement of these screws is high.

Further, the bad influences such as backlash, etc. can be removed by the operations of the second group springs 10a, 10b, the body tube springs 27, 28 and the first group springs 29 to 31 so that accuracy in operation can be further improved.

The second group frame cam 9 is directly rotated through the second transmission mechanical section 32 from the ring gear 15. Accordingly, there is almost no accumulated error in operation of the rotary transmission system and the zooming operation can be performed with high accuracy.

Further, since the adjusting gear 35 is disposed in a portion of the speed reduction gear group 33a in the second transmission mechanical section 32, it is possible to adjust the position relation with respect to the rotary angle of the second group frame cam gear 9b. Therefore, it is possible to adjust the position relation between the first lens group 5 and the second lens group 7.

As described in relation to FIG. 12, the adjusting gear 35 is disposed outside both the substrates 4b and 4c and is engaged with the small gear 34a and the second gear 36 therebetween. Therefore, after the speed reduction gear group 33a and the transmission member 33b are assembled, it is possible to finally assemble the adjusting gear 35 outside the substrate 4c so that the respective member can be efficiently assembled with each other irrespective of the performance of the lenses.

The present invention is not limited to the above-mentioned embodiments, but may be changed in various kinds of modifications within the scope of the features of the invention.

For example, as shown in the above embodiments, the body tube drive screws 18 to 20 are not necessarily constructed by right-handed screws and the first group drive screws 21 to 23 are not necessarily constructed by left-handed screws. The constructions of these drive screws can be suitably changed in accordance with the structure of the transmission mechanical section.

In the above embodiments, each of the body tube drive screws 18 to 20 has an approximately rectangular shape with convex end portions in cross section at one end thereof and has a circular shape in cross section at the other end thereof. However, each of the body tube drive screws 18 to 20 may have a circular shape in cross section at the one end thereof so as to restrict the degree of freedom in its rotary direction by friction, etc. Further, the degree of freedom by each of these screws or the degree of freedom of each of the body tube drive gears 17a, 17b and 17c in the radial direction may be slightly given such that the motor 11, etc. are not overloaded.

Similarly, each of the first group drive screws 21 to 23 may be constructed to restrict the degree of freedom in its rotary direction by friction, etc. Further, the degree of freedom by each of these screws and the degree of freedom of each of the first group drive gears 16a, 16b and 16c in the radial direction may be slightly given such that the motor 11, etc. are not overloaded. In accordance with such a structure, when the zooming or housing operation is performed, the body tube drive screws 18 and 19 and the first group drive screws 21 to 23 are not rotated by a frictional function since the degree of freedom of each of these screws in the rotary direction is restricted. Accordingly, it is possible to perform a desirable zooming or housing operation in accordance with the screw action. When the assembly of the driving apparatus is adjusted , it is possible to suitably rotate freely the body tube drive screws 18 and 19 and the first group drive screws 21 to 23.

As a result, firstly, the three body tube drive screws 18 and 19 and the three first group drive screws 21 to 23 are individually rotated in accordance with necessity so as to perform a parallel adjustment in assembly and a parallel adjustment for providing a desirable optical performance. Secondly, it is possible to easily adjust the shifting and backward moving operations required with respect to the photographic zoom lens. Accordingly, it is possible to assemble the driving apparatus irrespective of the lens performance so that operability in assembly can be greatly improved.

Further, in the above embodiments, the body tube springs 27 and 28 are constructed by compression springs. The second group springs 10a, 10b and the first group springs 29 to 31 are constructed by tension springs. However, these body tube springs may be constructed by tension springs and these first and second group springs may be constructed by compression springs when the resilient relations of these springs are suitably selected.

The shapes of the drive shaft 13a and the transmission shaft 38 in cross section are not limited to an approximately rectangular shape with convex and concave portions, but may be another shape such as spline in consideration of the suitable connection between these shafts and the drive gear 13 and the movable gear 13b.

In the above embodiments, screws are used as a means for driving the first group frame 6 and the body tube frame 4, but a driving mechanism such as rack and pinion can be used.

As mentioned above, in accordance with the first embodiment of the present invention, the construction of an apparatus for driving a photographic zoom lens is simplified and easily processed mechanically so that the cost of the driving apparatus can be reduced. Further, the range of the varifocal distance is wide and the size of the driving apparatus in the optical axis direction at the housing time can be reduced. In particular, it is possible to set the pressure angle of the zooming cam for restricting the position of the second group frame to a small angle. Therefore, the outer size of the zooming cam can be reduced and the body tube frame, the first group frame, etc. are smoothly operated and the lens groups are not inclined the focal lengths of these lens groups are changed. In particular, since multiple thread screws are used as the drive screws, the diameters of the drive screws can be reduced so that the entire driving apparatus can be made compact and the zooming and housing operations can be performed at high speeds. Further, transmission efficiency of the driving system can be improved.

In acordance with the second embodiment of the present invention, the construction of an apparatus for driving a photographic zoom lens is simplified and easily processed mechanically so that the cost of the driving apparatus can be reduced. Further, the range of the varifocal distance is wide and the size of the driving apparatus in the optical axis direction at the housing time can be reduced. In particular, it is possible to set the pressure angle of the zooming cam for restricting the position of the second group frame to a small angle. Therefore, the outer size of the zooming cam can be reduced and the body tube frame, the first group frame, etc. are smoothly operated and the lens groups are not inclined when the focal lengths of these lens groups are changed. Further, in the the transmission system for rotating the zooming cam, the rotary speed of the zooming cam is reduced from the transmission wheel directly through the second transmission mechanical section. Accordingly, there is almost no error in operation of this transmission system and it is possible to perform the moving and housing operations with respect to the lens groups with high accuracy.

In accordance with the third embodiment of the present invention, an adjusting gear for adjusting the position relation between the first and second lens groups is disposed in a system for transmitting the driving force of the second transmission mechanical section. Accordingly, it is possible to assemble the driving apparatus irrespective of the lens performance so that operability in assembly can be greatly improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for driving a photographic zoom lens comprising;
    at least first and second lens groups disposed on the same optical axis;
    a fixed frame fixed to a fixed section of an optical device;
    a body tube frame movably supported within said fixed frame along said optical axis;
    a first group frame supporting said first lens group in such a manner that a focusing operation with respect to said first lens group can be performed, and supported within said body tube frame so as to be capable of moving in parallel to said optical axis;
    a zooming cam rotatably supported by said first group frame around said optical axis;
    a second group frame fixedly supporting said second lens group, restricted and driven by said zooming cam, and movable along said optical axis;
    a drive means including a driving section and a series of gears receiving a driving force from said driving section and outputting said received driving force so an to perform a zooming operation which changes a focal length of said zoom lens composed of a varifocal optical system with said first lens group as a focusing lens;

a first transmission mechanical section including a plurality of gears receiving said outputted driving force from said drive means, and a transmission wheel meshing with one of a plurality of said gears to thereby rotate around a first axis along an optical axis of said apparatus;

a first driving means including at least one body tube drive screw adapted to be driven by a plurality of said gears in said first transmission mechanical section to thereby move said body tube frame in parallel to a direction of said optical axis;

a second driving means including at least one first group drive screw adapted to be driven by a plurality of said gears in said first transmission mechanical section to thereby move said first group frame in parallel to said direction of said optical axis; and a second transmission mechanical section including an output gear fixedly connected to one end portion of a transmission shaft and meshing with a second group frame cam gear fixed to one end of said zooming cam, an input gear attached to the other end portion of said transmission shaft in such a manner as to rotate together with said output gear, and a reduction gear group disposed between said transmission wheel and said input gear, said reduction gear group being so adapted as to rotate said input gear in an opposite direction to a rotational direction of said transmission wheel, and having a predetermined reduction gear ratio, respective rotating axes of said output gear, said input gear and respective gears which constitute said reduction gear group being in parallel with said first axis.

2. An apparatus for driving a photographic zoom lens according to claim 1, in which said reduction gear group comprises a first gear meshing with said transmission wheel, a first small gear fixed coaxially with said first gear, an adjusting gear meshing with said first small gear, a second small gear fixed coaxially with said adjusting gear, a second gear meshing with said second small gear, a third small gear fixed coaxially with said second gear, and a third gear meshing with both of said third small gear and said input gear, said adjusting gear and said second small gear being adapted to be capable of adjusting a positional relation between said first lens group supported by said first group frame and said second lens group supported by said second group frame.

3. An apparatus for driving a photographic zoom lens according to claim 2, in which said adjusting gear and said second small gear are adapted to be finally assembled.

* * * * *